United States Patent [19]

Sanders et al.

[11] Patent Number: 5,238,336

[45] Date of Patent: Aug. 24, 1993

[54] HAND HELD POWER DOWEL TOOL

[76] Inventors: Thomas A. Sanders, W5551 Volling La., Madison, Wis. 53908; David A. Gaauwe, Rte. 1, Box 190-A, Tomah, Wis. 54460

[21] Appl. No.: 953,125

[22] Filed: Sep. 29, 1992

[51] Int. Cl.⁵ .......................................... B23B 45/14
[52] U.S. Cl. ..................... 408/95; 408/112; 409/135
[58] Field of Search ............... 408/95, 14, 16, 110, 408/112, 115 R, 124, 712; 409/135, 231, 233

[56] References Cited

U.S. PATENT DOCUMENTS

| | | | |
|---|---|---|---|
| 2,849,900 | 9/1958 | Heidtman, Jr. | 408/112 |
| 3,244,030 | 4/1966 | Godfrey | 408/95 |
| 3,362,447 | 1/1968 | Elder, Jr. | 408/112 |
| 3,703,846 | 11/1972 | Krafft | 409/232 |
| 4,572,715 | 2/1986 | Wolff | 408/112 |
| 4,893,970 | 1/1990 | Becraft | 408/115 R |

FOREIGN PATENT DOCUMENTS

| | | | |
|---|---|---|---|
| 2617420 | 1/1989 | France | 408/112 |
| 566836 | 9/1975 | Switzerland | 408/112 |

OTHER PUBLICATIONS

Trend-Lines Catalog No. 502B, pp. 5 & 1B, 375 Beacham St., Chelsea, Mass. 02150; Publ. Date, Place, & Author Unknown.

Primary Examiner—Daniel W. Howell
Attorney, Agent, or Firm—Robert J. Harter

[57] ABSTRACT

A hand held power dowel tool includes a high speed universal motor coupled to a relatively simple two-gear transmission. The motor speed gear reduction combination is specifically designed for ¼ inch and ⅜ inch drilling of wood, making the tool unusually lightweight for the power it delivers. The tool's drive shaft is especially long and well supported to rigidly hold a conventional drill bit without a need for a drill guide bushing. A smooth acting guide assembly aligns the tool to the board and accurately guides the drill bit to a preset depth. The tool also includes an adjustable viewing window that is kept clear by a stream of air discharged by the tool's cooling system. The adjustable viewing window and an adjustable chuck accommodates wood of various width and thicknesses as well as various dowel peg diameters. The tool's range of wood joining capabilities surpasses today's plate joiners.

17 Claims, 3 Drawing Sheets

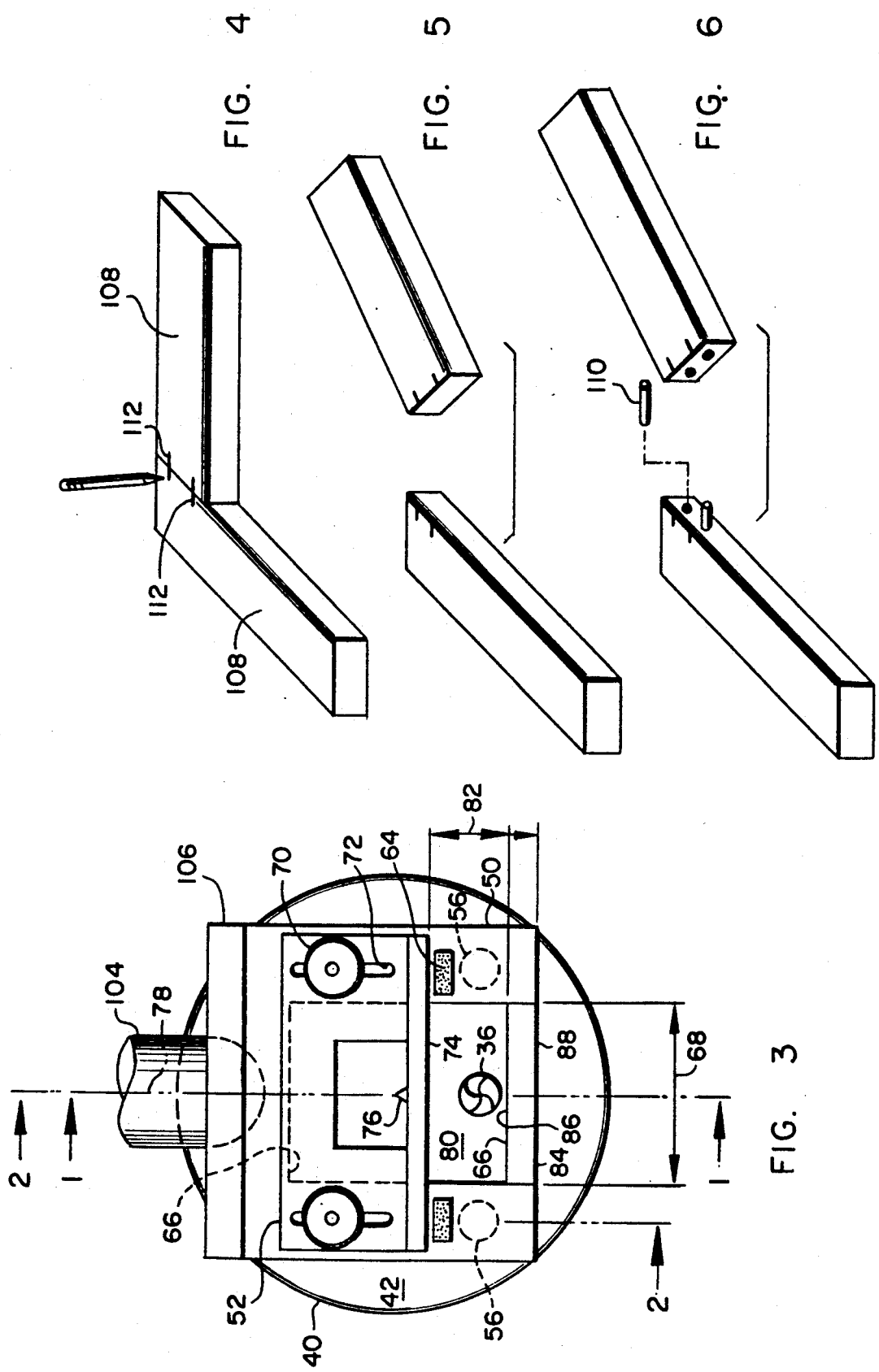

HAND HELD POWER DOWEL TOOL

BACKGROUND OF THE INVENTION

1. Field of the Invention

The invention generally pertains to hand held powered woodworking tools and specifically to tools for edge joining boards.

2. Description of Related Art

Plate joiners and dowel jigs are today's standard tools for edge joining boards. Plate joiners have radially cutting tools that cut a semicircular slit in the edge of each board to be joined. A round disk, referred to as a biscuit is inserted in the slits and serves to roughly align the boards being joined.

Plate joiners have their disadvantages. The worst is their tendency to kick sideways as the radially cutting edge of the tool touches the wood. This not only produces a poorly aligned joint but it's also dangerous. A second drawback is that with a radially cutting tool, the length of the slit becomes relatively long in order to get adequate slit depth. A long slit means the edge being joined must also be long. This becomes a real problem when joining pieces with narrow edges, such as those found in cabinet frames and chair tendons. A third problem is that the radially cutting tool is of a fixed size limiting its versatility in joining boards of various thicknesses. The "one size fits all" philosophy forces compromises rather than optimizing the joint design. A further disadvantage is that the cutting tool is coupled to its drive shaft at a location inside the housing. This makes it extremely difficult to remove the cutting tool for resharpening.

The other commonly used tool, a doweling jig, involves clamping a drill bushing to the boards being joined. The bushing serves as a guide for a conventional drill bit. Dowel jigs are time consuming to use and can leave clamp indentations in the wood.

SUMMARY OF THE INVENTION

To avoid the problems and limitations of present methods of joining wood (e.g., red oak), it is an object of the invention to provide a dowel tool with an adjustable opening viewing window.

Another object is to provide a hand held power dowel tool that is very lightweight due to a unique motor speed transmission combination that delivers a cutting speed that's faster than what's typically used for steel yet slower than a direct drive router which has a tendency to burn wood.

Another object is to provide a dowel tool with a cutting drill bit whose rotational axis is parallel to its direction of penetration to minimize side kick forces which tend to push the tool in a direction perpendicular to the direction of penetration.

An important feature of the invention is the rigid support of the drive shaft. The shaft's support bearings are spaced apart over half the length of the tool's housing. This eliminates the need for drill guide bushings.

Another object of the invention is to minimize any side kick by employing grippers.

Yet another object of the invention is to provide a dowel tool with an adjustable chuck to enable drilling for ¼ inch and ⅜ inch dowels. The chuck also facilitates resharpening of the drill bits.

A further object is to provide a joining tool for use with simple low cost dowel pegs as opposed to more expensive contoured biscuits.

A still further object is to provide a dowel tool with a narrow window of less than one inch wide to allow end joining of narrow boards, e.g., ⅜"×2"×30".

These and other objects and features of the invention are provided by a novel dowel tool having a high speed universal motor coupled to a two-gear transmission driving a long drive shaft supported by two spaced apart bearings. An adjustable chuck rigidly holds a drill bit without a need for a drill guide bushing. A guide assembly aligns the tool to the work piece and guides the drill bit. An adjustable viewing window along with the adjustable chuck accommodates wood of various width and thickness as well as various dowel peg diameters.

BRIEF DESCRIPTION OF THE DRAWINGS

FIG. 3 is a schematic end view of the subject invention.

FIG. 4 shows two boards being marked for joining.

FIG. 5 shows the same boards as in FIG. 4 ready for the dowel tool.

FIG. 6 shows dowels being inserted in the holes drilled by the dowel tool.

DESCRIPTION OF THE PREFERRED EMBODIMENT

Figure 1:
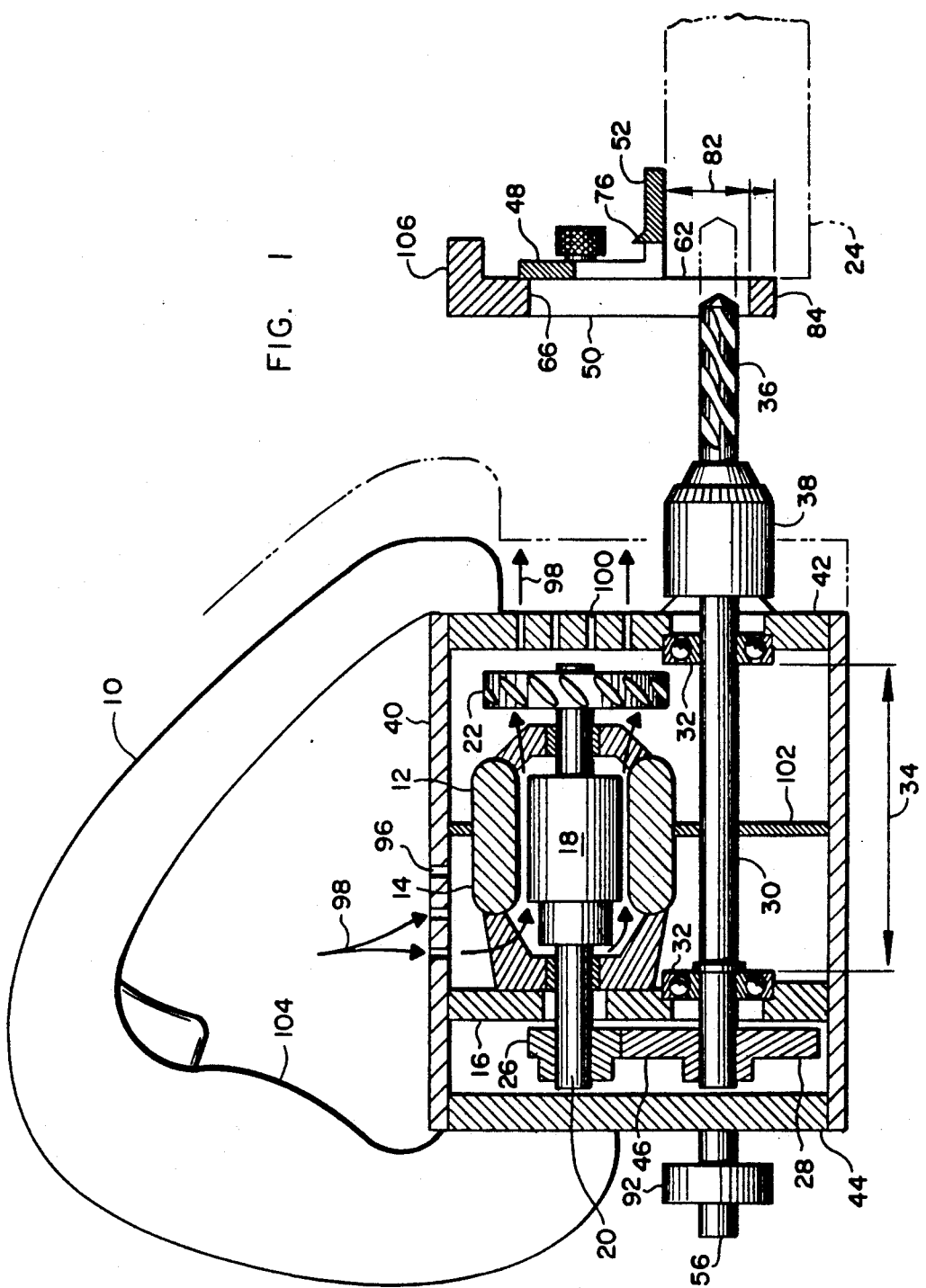
FIG. 1 is a partial schematic side cross-sectional view taken along line 1—1 of FIG. 3.
Figure 2:
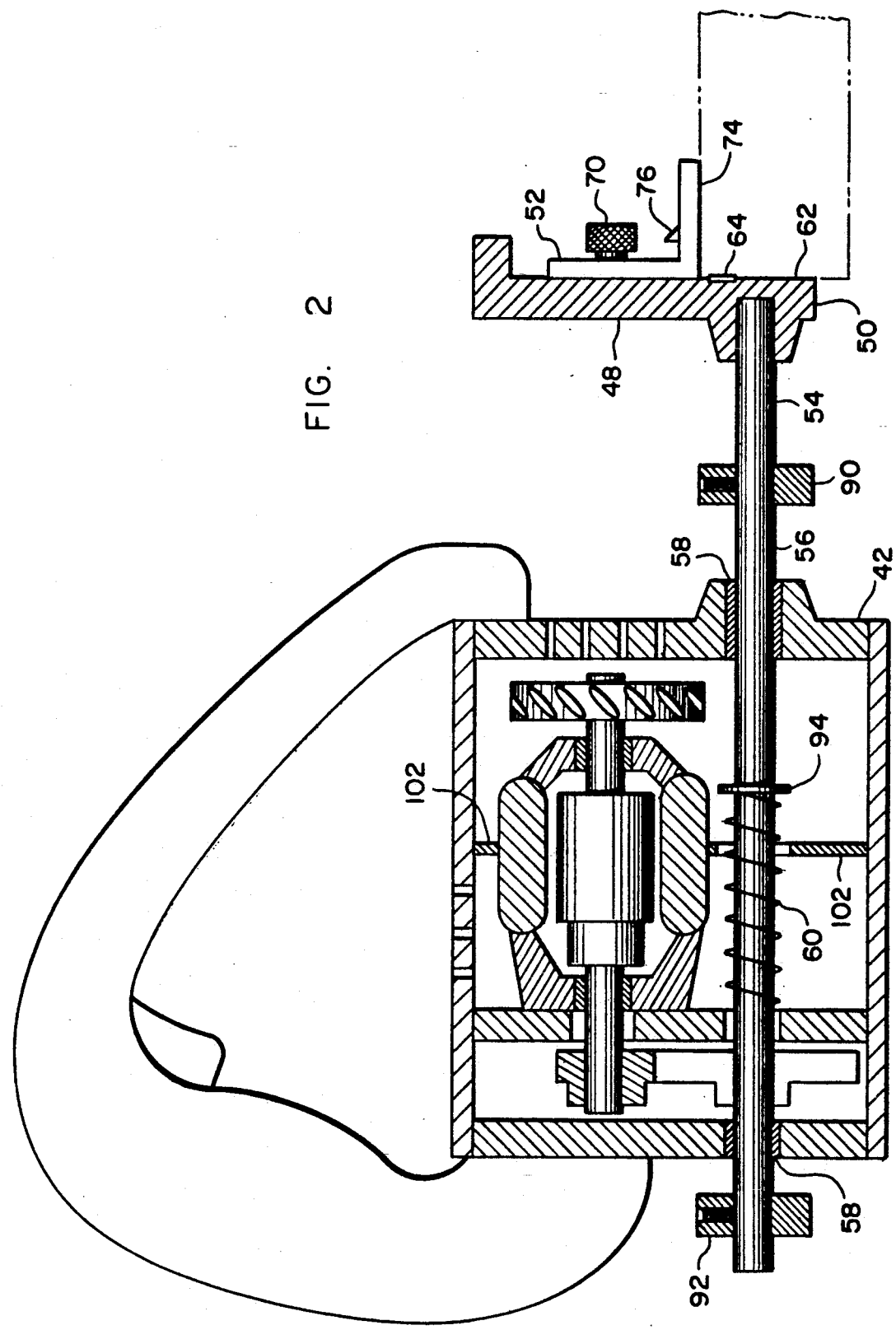
FIG. 2 is another partial schematic cross-sectional view taken along line 2—2 of FIG. 3.

Referring to FIGS. 1, 2, and 3, dowel tool 10 includes a high speed universal motor 12 with its stator 14 attached to a support plate 16. Motor 12 includes a rotor 18 with a rotor shaft 20 extending through it. A fan 22 is attached to one end of shaft 20 for cooling motor 12 and blowing wood chips away from an operator's workpiece 24. A pinion gear 26 is attached to the other end of shaft 20. Pinion 26 drives a larger gear 28 which is coupled to a drive shaft 30. Pinion 26 and gear 28 comprise a transmission 46 having a speed ratio that subjects drive shaft 30 to at least twice the torque that rotor shaft 20 delivers. In one embodiment of the invention, the maximum operational speed of drive shaft 30 exceeds 3,000 RPM's. In one embodiment of the invention motor 12 is a model B-72585 by Northland of Watertown, N.Y. (A Scott Fetzer Company), and pinion and gear 28 are Part Numbers IC2-N24017 and IC2-N24060, respectively, of Stock Drive Products of New Hyde Park, N.Y. (a division of Designatronics Inc.). High speed motor 12 and high torque transmission 46 provide for a lightweight hand held tool weighing less than 20 pounds.

Two bearings 32 hold drive shaft 30 substantially parallel to rotor shaft 20. Bearings 32 are spaced apart by a distance 34 at least twice as great as the smallest diameter of drive shaft 30. This ensures ridged support of a cantilevered drill bit 36. Drill bit 36 is coupled to drive shaft 30 by way of an adjustable chuck 38 having an adjustable opening adapted to hold ¼ inch and ⅜ inch diameter drill bits.

A housing 40 holds motor 12, drive shaft 30, bearings 32, and transmission 46. Housing 40 includes a front end plate 42 and a back end plate 44 with support plate 16 between the two. One bearing 32 is mounted on support plate 16 and the other bearing 32 is mounted on front plate 42.

A guide assembly 48, comprising a face guide 50 and a top guide 52, is slidably mounted to housing 40 by way of a slide mechanism 54. Guide assembly 48 is used to properly position dowel tool 10 with respect to an operator's wooden workpiece 24.

Slide mechanism 54 includes two substantially parallel guide rods 56 rigidly attached to face guide 50. Guide rods 56 slidably extend through housing 40 and are maintained substantially parallel to drive shaft 30 by way of bushings 58. Slide mechanism 54 also includes a spring 60 that urges face guide 50 away from chuck 38.

Face guide 50 has a first surface 62 that is substantially perpendicular to drive shaft 30. At least a portion of first surface 62 is provided with a gripper 64 having a coefficient of friction against wood that is greater than if the entire face of surface 62 were perfectly flat and smooth. In one embodiment of the invention, gripper 64 includes pads of sandpaper; however, gripper 64 could comprise grip pins, rubber strips, or a roughened surface integrally molded in face guide 50. Face guide 50 has an opening 66 through which drill bit 36 can extend. Opening 66 has a width 68 that is greater than the diameter of drill bit 36 and less than the width of workpiece 24. In one embodiment of the invention, opening 66 has a width appreciably greater than $\frac{3}{8}$ inches and less than 2 inches.

Top guide 52 is adjustably attached to face guide 50 by way of thumb screws 70 and slots 72. Top guide 52 includes a second surface 74 which is substantially perpendicular to first surface 62. The adjustable attachment of top-guide 52 facilitates varying the distance between second surface 74 and the longitudinal center line of drive shaft 30. In one embodiment of the invention, the distance is adjustable from less than $\frac{1}{4}$ inches to over $\frac{3}{8}$ inches.

Guide assembly 48 includes an alignment mark 76 intersecting a plane 78 substantially perpendicular to both said first surface 62 and said second surface 74 and passing through said longitudinal center line of drive shaft 30. In one embodiment of the invention, mark 76 is on top guide 52 and in another embodiment mark 76 is on face guide 50.

Referring to FIG. 3, the adjustment of top guide 52 provides a variable opening viewing window 80 defined by opening 66 and second surface 74. The width of window 80 is equal to the width of opening 66. The height 82 of window 80 is equal to the distance from second surface 74 to a lower edge of face guide 50. When face guide 50 includes a bridge member 84 as shown in FIG. 3, the lower edge of face guide 50 is denoted by numeral 86. In another embodiment of the invention which does not have a bridge member 84, i.e., window 80 is open at the bottom, lower edge of face guide 50 is denoted by numeral 88. In a preferred embodiment of the invention, the height of window 80 is at least 0.5 inches.

The travel distance of slide mechanism 54 is limited by a back stop and an adjustable front stop 90. When a back shaft collar 92 is attached to guide rod 56, the back stop is provided by the adjustable position of back shaft collar 92. When back shaft collar 92 is removed, the back stop is provided by a spring retainer 94 abutting front end plate 42. It should be appreciated by those skilled in the art that a countless variety of means can serve as the back stop. The term, "back stop" as used herein refers to any means for limiting the travel distance that guide assembly 48 can move away from housing 40. Similarly, the front stop is a repositionable shaft collar 90 on guide 56 and represents just one of many imaginable means for limiting the travel distance that guide assembly 48 can move toward housing 40.

Referring to FIG. 1, fan 22 draws air 98 from outside housing 40 through inlet air vent 96 and discharges through outlet air vent 100. A baffle 102 obstructs at least some of the airflow, forcing some air to pass between rotor 18 and stator 14. The primary purpose is to cool motor 12. In one embodiment of the invention, outlet vent 100 is situated so that the discharge airflow is directed toward viewing window 80 helping to clear wood chips from view. In addition, support plate 16 is situated in housing 40 to help isolate transmission 46 from any dirty airflow.

For balance and ease of operation, two handles 104 and 106 are attached to dowel tool 10. The first handle 104 is attached directly to housing 40 and the second handle 106 is attached to guide assembly 48. Both handles pass across plane 78. An operator puts one hand on each. With dowel tool 10 against its back stop 92, the operator aligns guide assembly 48 against workpiece 24. Pushing dowel tool 10 toward workpiece 24 drills a hole to a depth determined by the position of front stop 90.

FIGS. 4, 5, and 6 illustrate a sequence of operation in joining two boards 108 with two dowels 110. Boards 108 are held together and two pencil marks 112 are scribed as shown in FIG. 4. The dowel tool's alignment mark 76 is aligned to pencil marks 112, and four holes are drilled. Dowels 110 are inserted in the holes making boards 108 ready for joining with glue.

Although the invention is described with respect to a preferred embodiment, modifications thereto will be apparent to those skilled in the art. Therefore, the scope of the invention is to be determined by reference to the claims which follow:

We claim:

1. A dowel tool adapted to drive a drill bit through wood, comprising:
   a) a high speed motor having a stator, a rotor, and a rotor shaft, said motor being adapted to run at over 10,000 revolutions per minute;
   b) a drive shaft in substantial parallel offset alignment with said motor shaft;
   c) at least two bearings supporting said drive shaft, said bearings being axially spaced apart from each other at a distance of at least twice the diameter of said drive shaft;
   d) a transmission coupling said motor shaft to said drive shaft, said transmission delivering a torque to said drive shaft that is at least twice as great as the torque exerted by said motor shaft;
   e) a housing holding said motor said drive shaft, said two bearings, and said transmission;
   f) a face guide slidably mounted with respect to said housing and having a first surface substantially perpendicular to said drive shaft, said face guide having a viewing window therethrough;
   g) a top guide having a second surface substantially perpendicular to said first surface, said top guide being repositionable with respect to said drive shaft to vary the distance between said second surface and the longitudinal center line of said drive shaft from at least 0.25 inches to 0.375 inches, thereby providing a variable opening through said window;

h) an alignment mark on said top guide, said alignment mark intersecting a plane substantially perpendicular to said first and second surfaces and passing through said longitudinal center line of said drive shaft;

i) a slide mechanism for varying the axial position of said drive shaft with respect to said face guide while maintaining substantially perpendicular alignment of said drive shaft to said first surface of said face guide;

j) a chuck connected to one end of said drive shaft between said face guide and one of said bearings, said chuck being adapted to couple said drill bit to said drive shaft;

k) a spring urging said face guide away from said chuck;

l) a back stop limiting the distance said spring urges said face guide away from said chuck;

m) an adjustable front stop providing a user selectable limiting distance between said chuck and said first surface of said face guide, whereby said front stop determines the depth to which said drill bit penetrates said wood;

n) a fan coupled to said motor shaft and adapted to draw air into said housing and discharge air out of said housing;

o) a first handle attached to said housing and extending across said plane; and p) a second handle associated with a guide assembly comprising said top guide and said face guide.

2. The dowel tool as recited in claim 1 further comprising a gripper disposed on said first surface, said gripper having a coefficient of friction against said wood that is greater than the coefficient of said first surface against said wood if the entire face of said first surface had no gripper and were perfectly flat and smooth.

3. The dowel tool as recited in claim 1, wherein said chuck is an adjustable chuck with a variable opening adapted to hold said drill bit of a diameter of 0.25 to 0.375 inches.

4. The dowel tool as recited in claim 1, further comprising a baffle inside said housing, adjacent to said motor, and adapted to promote the flow of a portion of said air through the space between said rotor and said stator by at least partially obstructing free airflow that would otherwise pass across the outer perimeter of said rotor.

5. The dowel tool as recited in claim 1, wherein at least a portion of said air being discharged out of said housing is directed toward said adjustable opening viewing window.

6. The dowel tool as recited in claim 1, wherein said variable opening through said window is adjustable to a height of at least 0.5 inches and a width of less than 2 inches.

7. The dowel tool as recited in claim 1, wherein the motor revolutions per minute of over 10,000 along with said transmission provide said dowel tool with a total weight of less than 20 pounds.

8. The dowel tool as recited in claim 1, wherein the maximum operational speed of said drive shaft exceeds 3,000 revolutions per minute.

9. The dowel tool as recited in claim 1, wherein said back stop is operator adjustable to vary the limiting distance said spring urges said face guide away from said chuck.

10. A dowel tool adapted to drive a drill bit through wood, comprising:

a) a high speed motor having a stator, a rotor, and a rotor shaft, said motor being adapted to run at over 10,000 revolutions per minute;

b) a drive shaft in substantial parallel offset alignment with said motor shaft;

c) at least two bearings supporting said drive shaft, said bearings being axially spaced apart from each other at a distance of at least twice the diameter of said drive shaft.

d) a transmission coupling said motor shaft to said drive shaft, said transmission delivering a torque to said drive shaft that is at least twice as great as the torque exerted by said motor shaft, said motor revolutions per minute of over 10,000 along with said transmission providing said dowel tool with a total weight of less than 20 pounds;

e) a housing holding said motor, said drive shaft, said two bearings, and said transmission;

f) a face guide slidably mounted with respect to said housing and having a first surface substantially perpendicular to said drive shaft, said face guide having a viewing window therethrough;

g) a gripper disposed on said first surface that provides a coefficient of friction against wood that is greater than the coefficient of said first surface against wood if the entire face of said first surface had no gripper and were perfectly flat and smooth;

h) a top guide having a second surface substantially perpendicular to said first surface, said top guide being repositionable with respect to said drive shaft to vary the distance between said second surface and the longitudinal center line of said drive shaft from at least 0.25 inches to 0.375 inches, thereby providing a variable opening through said window;

i) an alignment mark disposed on said top guide, said alignment mark intersecting a plane substantially perpendicular to said first and second surfaces and passing through said longitudinal center line of said drive shaft;

j) a slide mechanism for varying the axial position of said drive shaft with respect to said face guide while maintaining substantially perpendicular alignment of said drive shaft to said first surface of said face guide;

k) an adjustable chuck connected to one end of said drive shaft between said housing and said face guide, said adjustable chuck having a variable opening adapted to hold said drill bit of a diameter of 0.25 to 0.375 inches;

l) a spring urging said face guide away from said adjustable chuck;

m) a back stop limiting the distance of said spring urges said face guide away from said adjustable chuck;

n) an adjustable front stop providing a user selectable limiting distance between said adjustable chuck and said first surface of said face guide, whereby said adjustable front stop determines the depth to which said drill bit penetrates said wood;

o) a fan coupled to said motor shaft and adapted to draw air into said housing and discharge out of said housing, thereby cooling said motor;

p) a first handle attached to said housing and extending across said plane; and q) a second handle associated with a guide assembly comprising said top guide and said face guide, said second handle extending across said plane.

11. The dowel tool as recited in claim 10 further comprising a baffle inside said housing, adjacent to said motor, and adapted to promote the flow of a portion of said air through the space between said rotor and said stator by at least partially obstructing free airflow that would otherwise pass across the outer perimeter of said rotor.

12. The dowel tool as recited in claim 10, wherein at least a portion of said air being discharged out of said housing is directed toward said adjustable opening viewing window.

13. The dowel tool as recited in claim 10, wherein said variable opening through said window is adjustable to a height of at least 0.5 inches and a width of less than 2 inches.

14. The dowel tool as recited in claim 10, wherein the maximum operational speed of said drive shaft exceeds 3,000 revolutions per minute.

15. The dowel tool as recited in claim 10, wherein said back stop is operator adjustable to vary the limiting distance said spring urges said face guide away from said chuck.

16. A dowel tool adapted to drive a drill bit through wood, comprising:
   a) a high speed motor having a stator, a rotor, and a rotor shaft, said motor being adapted to run at over 10,000 revolutions per minute;
   b) a drive shaft in substantial parallel offset alignment with said motor shaft;
   c) at least two bearings supporting said drive shaft, said beings being axially spaced apart from each other by a distance of at least twice the diameter of said drive shaft;
   d) a transmission coupling said motor shaft to said drive shaft to rotate said drive shaft at least 3,000 revolutions per minute when said motor is running at its maximum substantially unloaded speed, said transmission delivering a torque to said drive shaft that is at least twice as great as the torque exerted by said motor shaft, said motor revolutions per minute of over 10,000 along with the gear reduction of said transmission providing said dowel tool with a total weight of less than 20 pounds;
   e) a housing holding said motor, said drive shaft, said two bearings, and said transmission;
   f) a face guide slidably mounted with respect to said housing and having a first surface substantially perpendicular to said drive shaft, said face guide having a viewing window therethrough that is less than 2 inches wide;
   g) a gripper disposed on said first surface that provides a coefficient of friction against wood that is greater than the coefficient of said first surface against wood if the entire face of said first surface had no gripper and were perfectly flat and smooth;
   h) a top guide having a second surface substantially perpendicular to said first surface, said top guide being repositionable with respect to said drive shaft to vary the distance between said second surface and the longitudinal center line of said drive shaft from at least 0.25 inches to 0.375 inches, thereby providing a variable opening through said window of at least 0.5 inches;
   i) an alignment mark disposed on said top guide, said alignment mark intersecting a plane substantially perpendicular to said first and second surfaces and passing through said longitudinal center line of said drive shaft;
   j) a slide mechanism for varying the axial position of said drive shaft with respect to said face guide while maintaining substantially perpendicular alignment of said drive shaft to said first surface of said face guide;
   k) an adjustable chuck connected to one end of said drive shaft between said housing and said face guide, said adjustable chuck having a variable opening adapted to hold said drill bit of a diameter of 0.25 inches to 0.375 inches;
   l) a spring urging said face guide away from said adjustable chuck;
   m) a back stop limiting the distance said spring urges said face guide away from said adjustable chuck;
   n) an adjustable front stop providing a user selectable limiting distance between said adjustable chuck and said first surface of said face guide, whereby said adjustable front stop determines the depth to which said drill bit penetrates said wood;
   o) a fan coupled to said motor shaft and adapted to draw air into said housing and discharge out of said housing with at least a portion of the discharge air being directed toward said window;
   p) a baffle inside said housing, adjacent to said motor, and adapted to promote the flow of a portion of said air through the space between said rotor and said stator by at least partially obstructing free airflow that could otherwise pass across the outer perimeter of said rotor;
   q) a first handle attached to said housing and extending across said plane; and
   r) a second handle associated with a guide assembly comprising said top guide and said face guide said second handle extending across said plane.

17. The dowel tool as recited in claim 16, wherein said back stop is operator adjustable to vary the limiting distance said spring urges said face guide away from said chuck.

* * * * *